Jan. 10, 1939.  A. KÉGRESSE  2,143,321
HYDRAULIC CLUTCH MECHANISM
Filed Feb. 5, 1937  4 Sheets-Sheet 1
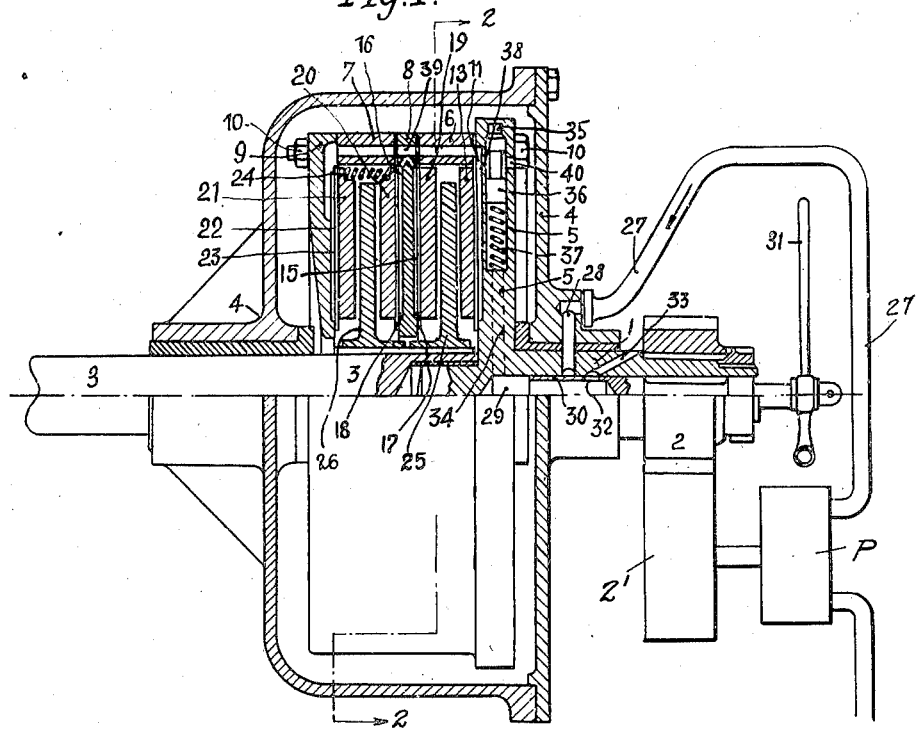
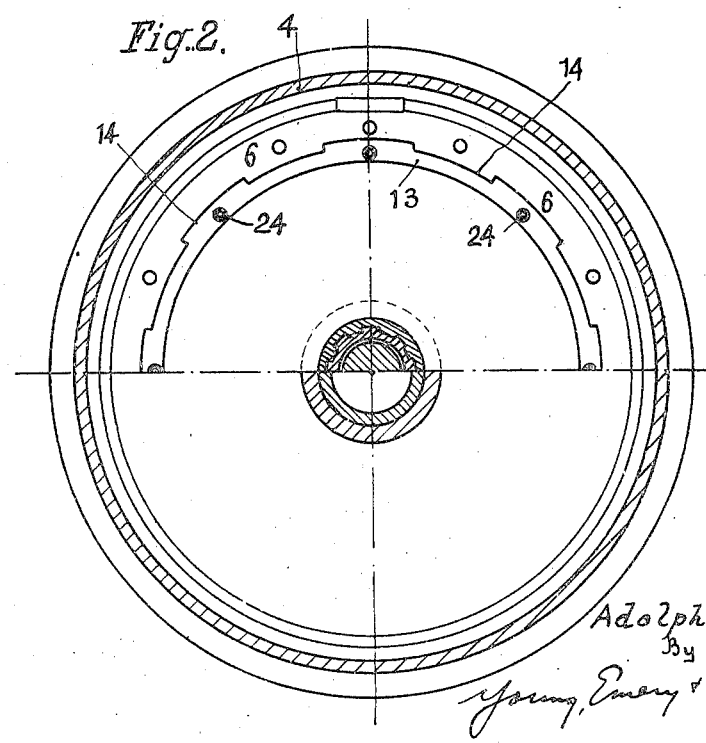
Inventor
Adolphe Kégresse
By
Young, Emery & Thompson
Attorneys

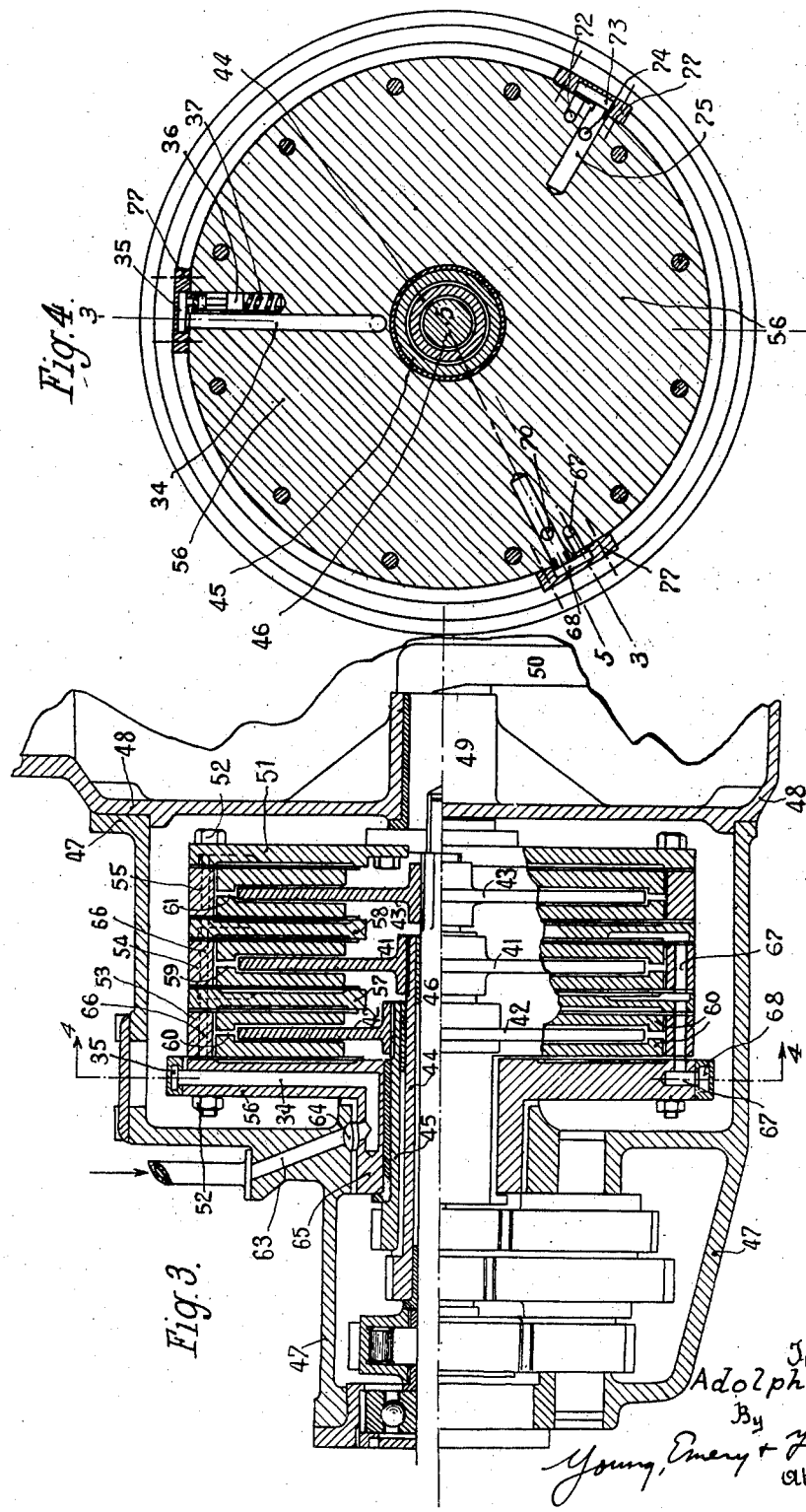

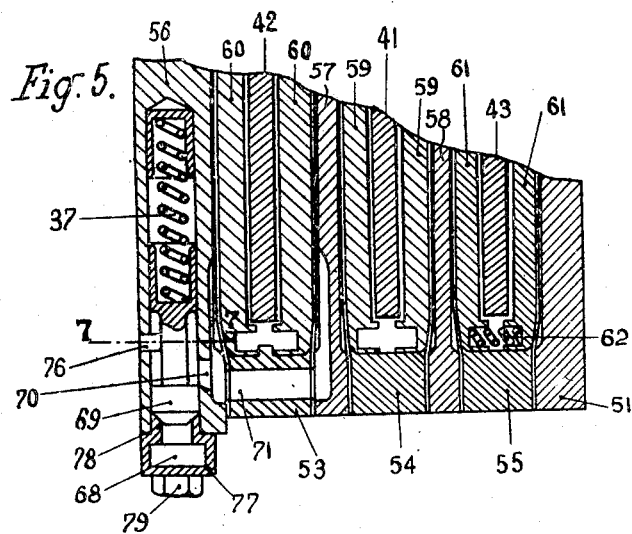
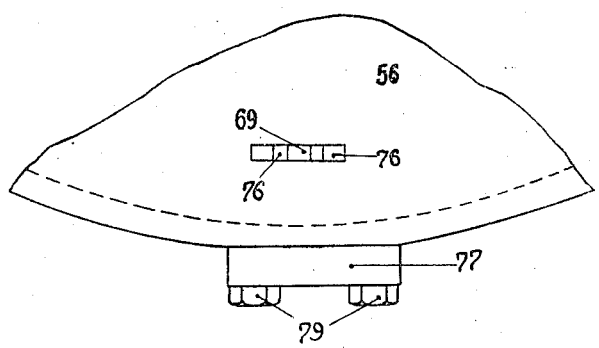
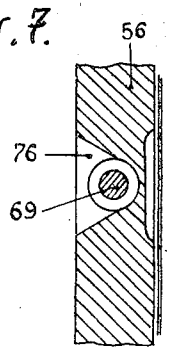

Inventor
Adolphe Kégresse
By
Young, Emery & Thompson
Attorneys

Patented Jan. 10, 1939

2,143,321

UNITED STATES PATENT OFFICE 2,143,321

HYDRAULIC CLUTCH MECHANISM

Adolphe Kégresse, Paris, France

Application February 5, 1937, Serial No. 124,308
In France February 10, 1936

5 Claims. (Cl. 192—87)

This invention relates to clutches with hydraulically compressed discs and more particularly to improvements in such clutches comprising discs which are compressed hydraulically and directly by means of turning diaphragms, the introduction of the pressure fluid being controlled by a piston valve the mass of which is determined to counterbalance the effect of centrifugal force on the fluid head which it controls.

The satisfactory operation of such clutches depends principally on the turning diaphragm which transmits the hydraulic pressure to the disc or discs, and also on the correct admission of the pressure fluid.

The importance of this latter condition is obvious, especially when the clutch is used in automatic change speed gear transmissions for motor cars, motor cycles and the like, where the fluid distribution plays a part of first importance.

In fact, changing gears must be effected in the desired order and without any possible confusion both in selecting a higher gear and in selecting a lower gear.

In former devices patented by applicant the pressure fluid acts on a diaphragm which shifts a movable plate bearing on one face of a clutch disc the other face of which bears on a fixed plate. This results in an axial movement of the disc on its shaft, which has certain disadvantages, as the disc hub has to slide on a splined shaft, and in order to avoid jamming this shaft must have certain dimensions which it is often impossible to provide, especially in the case of multiple clutches.

Moreover, the axial movement of the disc, which must be sufficient not only for somewhat considerable clearance necessary in running with the clutch disengaged, but also to provide compensation of unavoidable wear, requires substantial movement which it is not always possible to obtain.

Furthermore, the diaphragm has to be thin to reduce the flexing pressure and to give the instantaneity of operation required for correct automatic gear change in motor vehicles.

The invention also relates to certain constructive details of the diaphragm and holder, and of the piston valve chambers.

Several embodiments of the invention are shown by way of example in the accompanying drawings, in which Figure 1 is an elevational sectional view of a clutch with two discs for coupling two shafts together.

Figure 2 is a sectional view through the line 2—2 of Figure 1.

Figure 3 is a sectional view taken on line 3—3 of Figure 4, of a clutch and change speed gear unit with three speeds for motor cars.

Figure 4 is a sectional view through the line 4—4 of Figure 3.

Figure 5 is a partial sectional view through the line 5—5 of Figure 4.

Figure 6 is a partial side view of the device shown in Figure 5.

Figure 7 is a partial horizontal sectional view through the line 7—7 of Figure 5.

Figure 9:
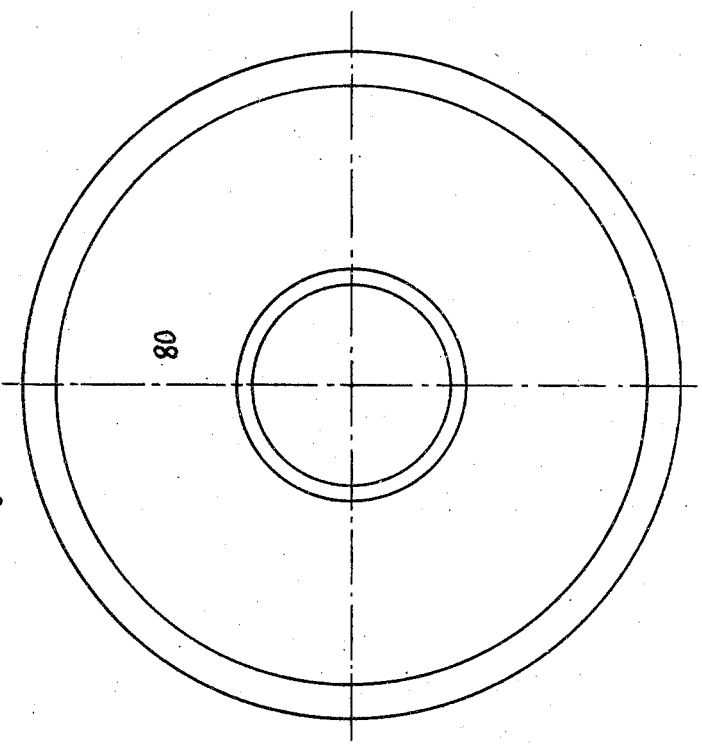
Figure 9 is an elevational view of a diaphragm.

The clutch shown in Figures 1 and 2 is adapted for coupling two shafts. It can be used for all kinds of machines and can form a part of the leading or steering unit of vehicles having an integral caterpillar; it can also be used for coupling any engine to its transmission in motor cars, ships, aircraft, and for electro-mechanical purposes and the like.

In the present case the driving shaft 1 (Figure 1) receives its movement, for instance, from a gear 2. The shaft 3 is the driven shaft. Both shafts 1 and 3 are supported by the casing 4.

The shaft 1 inwardly of the casing 4 carries a plate 5 on which are mounted, on its periphery, cross pieces 6 and 7 and fixed plates 8 and 9 (Figures 1 and 2), the plate 9 forming the inner wall of the clutch. The cross pieces and the plates are rigidly secured together by connecting bolts 10. The plate 5 (Figure 1) is provided on its inner face with a shallow recess in the form of an annular cup 11 against the edges of which rests a flat annular diaphragm 12 which is sealed at its periphery and at its inner edge with respect to the plate 5 (Figure 1).

The opposed face of the diaphragm 12 bears on the movable plate 13 which carries on its outer periphery splines forming driving teeth 14 (Figure 2) engaging corresponding splines or teeth in the inner edge of the cross pieces 6 and 7 (Figures 1 and 2).

The fixed plate 8 is hollowed on both its faces in order to form two annular cups 15 and 16 having a slight depth and similar to those of the driving plate 5. Each of the said shallow cups is hermetically sealed by a diaphragm 17 and 18 respectively (Figure 1). The diaphragm 17, with the face opposed to the plate 8, bears on a movable plate 19 provided on its outer periphery with teeth or splines in a similar manner as the movable plate 13 opposite the same.

The diaphragm 18 of the fixed plate 8 bears on a movable plate 20 similar to the plates 19 and 13 and located opposite a fourth similar plate 21 bearing on a fourth diaphragm 22. The latter covers a cup 23 in the outer fixed plate 9 (Figure 1).

Located between the movable plates 13, 19, 20 and 21 are a plurality of small peripherally disposed springs 24 (Figures 1 and 2) which yieldingly urge the said plates apart.

The clutch discs 25 and 26 are keyed to the driven shaft 3.

In the example shown the fluid under pressure is supplied by pump P driven by gear 2' meshing with gear 2 of shaft 1. It flows through the pipe 27 and through suitable ports 28 (Figure 1) to a central bore 29 of the driving shaft 1 which carries a cylindrical slide valve 30 controlled by a hand lever 31. The pump P is not part of the present invention and is illustrated to facilitate understanding of the invention.

The said slide valve is provided with ports 32 which can be put into communication either with the fluid supply ports 28 or with the atmosphere through an outlet passage 33.

In Figure 1 the slide valve is shown closed, that is to say that the fluid supply port 28 for the fluid under pressure is closed. The chamber 29 communicates with the atmosphere through the duct 33.

When the ports 32 of the slide valve 30 register with the supply ports 28 the fluid under pressure flows through a duct 34 (shown in dotted lines in Figure 1) to the top 35 of a piston valve 36 held against its seat by a spring 37 until the pressure of the fluid overcomes the resistance of this spring. At this moment the valve 36 opens and uncovers the port 38 which permits the fluid to flow through a duct 39 and fill the chambers 14, 15, 16 and 23. Under the action of the fluid pressure the yielding diaphragms 12, 17, 18 and 22 are flexed and bear on the movable plates 13, 19, 20 and 21 which are thus moved towards the discs. Thus the plates 13 and 19 clamp between them the disc 25, and the plates 20 and 21 the disc 26, whereby the driven shaft is rigidly connected with the driving shaft.

When the slide valve 30 is brought again to the position shown in Figure 1 the pressure falls in all the ducts. The valve 36, which is moved back by its spring 37, comes again to the position shown, i. e. it closes the fluid supply and releases the fluid in the diaphragm chambers by uncovering the outlet 40. The springs 24 bring the movable plates back to the position shown in the drawings; thus the discs 25 and 26 are released and the shaft 3 is at rest.

The above described device may comprise only a single clutch disc instead of two. In this case it will have only two diaphragms and two movable plates.

For greater powers or for reasons concerning the space required in the diameter, it is also possible to use a device comprising three or four or more discs, each of them being controlled by a pair of movable plates and diaphragms.

In the example which is described a single piston valve controls the passage of the fluid. Obviously, the device can comprise two or more such valves without departing from the principle of the invention.

As mentioned, Figures 3, 4, 5, 6 and 7 show an application of the clutch to motor cars. The said clutch solves the problem of the automatic change speed gear.

In this case the clutch discs 41, 42 and 43 (Figure 3) are keyed on three concentric and independent shafts 44, 45 and 46 (Figures 3 and 4).

In the example which has been selected the casing 47 which contains the clutches and the gears is fastened to the casing 48 of the engine.

On the end 49 of the crank shaft 50 is secured the plate 51 which forms a flywheel, the other parts of the device being mounted on the latter by means of bolts 52. The splined cross pieces or inner teeth are shown at 53, 54 and 55, the fixed plates are designated by 56, 57 and 58 (Figures 3 and 5). The corresponding diaphragms have not been specially designated. The said parts have the same functions as the corresponding parts of the foregoing embodiment shown in Figures 1 and 2.

The plates 59, 60 and 61, which are movable in pairs, (Figures 3 and 5), engage splines or teeth in the cross pieces 53, 54 and 55 and are resiliently urged apart in spaced relation in a suitable manner for running with the clutch disengaged by springs 62 (Figure 5).

The fluid under pressure is supplied through the duct 63 and flows into a groove 64, then through the rotating hub 65 which is integral with the plate 56 forming a distributing device, after which the fluid enters the duct 34 (Figures 3 and 4) and finally reaches the small chamber 35 (Figures 3 and 4) provided at the top of the piston valve 36 (Figure 4).

For insuring a perfectly satisfactory operation, that is to say for insuring that the drive through the gears is established without any error and in the desired order, the fluid in this case flows in a special way, which forms one of the features of the invention. While the device is for a plurality of gears, it has only one fluid supply coming from the manifold 65 and formed, as already mentioned, by the duct 34 (Figures 3 and 4) which opens at the top of the piston valve 36 (Figure 4) for the first gear. From here and when the running conditions are fulfilled so that the pressure on the fluid is sufficient, the fluid flows through the duct 66 shown in dotted lines in Figure 3 and then arrives at the diaphragms which control both movable plates 59 insuring, at the desired moment, that the disc 41 keyed on the shaft 44 provided with the first gear pinion is driven. It may be seen that the fluid cannot act on the diaphragms of the plate pair 59 until after having overcome the resistance of the spring 37 of the piston valve 36 (Figure 4), i. e. after having reached a given pressure sufficient for driving the first gear disc. The fluid flows out through the port 67 (Figures 3 and 4) of the chambers controlling the first gear and then enters the chamber 68 (Figures 3, 4 and 5) which is closed by the piston valve 69 (Figure 5) similar to the piston valve 36 for the first gear. When the fluid pressure is sufficiently high for opening the piston valve 69, the fluid enters the port 70 (Figures 4 and 5) and the duct 71 (Figure 5) and flows until past the diaphragms controlling the pair of movable plates 60 (Figure 5) which control the disc 42 (Figures 3 and 5) for the second gear. Following its way farther the fluid flows from the diaphragms for the second gear to the diaphragms for the third gear through the port 72 (Figure 4), chamber 73 and duct 74 (Figure 4) controlled by the piston valve 75 located in the bore 75 (Figure 4). From here the fluid flows past the diaphragms of the movable plates 61 controlling the clutch disc 43 for the third or high gear. It will be observed that the three piston valves are similar for the three gears and that their operation is identical to the operation of the valve 69 shown on a larger scale in Figure 5. The springs 37 only (Figure 5) are of increasing force; the weakest acts on the piston valve 36 for the first gear and the strongest acts on the piston valve for the third gear which is located in the bore 75 (Figure 4) with the corresponding valve.

The fluid flows out of the three piston valves through a port 76 (Figures 5, 6 and 7) which is automatically uncovered as soon as the pressure of the fluid on the piston valve becomes weaker than the force of the spring 37 (Figure 5). Figure 5 shows the piston valve in the exhaust position, the admission of the fluid being closed.

This arrangement makes it possible to obtain the gear change in the desired order without any possible confusion. In fact, it may be seen that the pressure fluid must fill the diaphragm chambers for the first gear and thus actuate this gear before operating the diaphragms for the second gear. The latter will be under pressure before the third gear can operate, since the fluid can reach this third gear only after having filled the diaphragm chambers for the second gear. The selection of lower gears, which occurs when the fluid pressure falls is also effected in the desired order, since, the three piston valves being similar, the piston valve for the third gear will be first closed, its return spring being the strongest, after which the piston valve for the second gear is then closed, because its spring is stronger than the spring for the first gear.

The invention also relates to the form of construction of the piston valve seat and of the chamber which places the inlets and outlets of the fluid in communication with each other.

The distributing plate 56 (Figures 3, 4, 5, and 6) comprises, on its periphery, as many flats as there are piston valves. The said flats are perpendicularly arranged with respect to the axis of the piston valves and receive a member of special form 77 (Figures 3, 4, 5 and 6) which will be called the bow. Said member 77 carries a cylindrical guide 78 (Figure 5) which simultaneously forms a seat for the piston valve. As already mentioned, the bow contains a chamber 35, 68 and 73 which permits of establishing the communication for the ports 34 and 66 (Figures 3 and 4) for the first gear, 67 and 70 (Figures 3, 4 and 5) for the second gear and 72, 74 (Figure 4) for the third gear. The bows 77 are secured on the distributing plate by means of the bolts 79 (Figure 6).

In order that clutches of the described type are faultless in operation they must be used in a certain manner depending on their assembly. The latter also forms a feature of the present invention.

Figure 10:
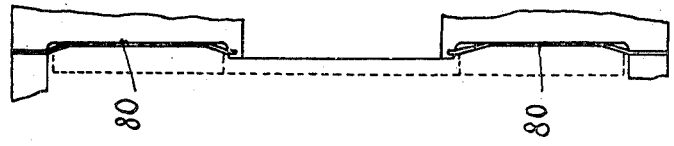
Figure 10 is a side view of a diaphragm in the position with the clutch disengaged.

Each diaphragm is formed of a ring 80 (Figures 8 and 9) of very thin metal which is clamped on its periphery between the rings and the fixed plates and tightened or welded with its inner edge on the same fixed plate while leaving between itself and the plate an interval of some tenths of a millimetre corresponding to the possibility of yielding deformation of the diaphram on the side of the fixed plate (Figure 10).

The depth of this interval approximately corresponds to the play which is necessary for obtaining the freedom between the clutch disc and the corresponding movable plate. The diaphragm takes a position with the clutch disengaged under the pressure of the movable plate on which the pressure of the springs 62 (Figure 5) is exerted.

Figure 11:
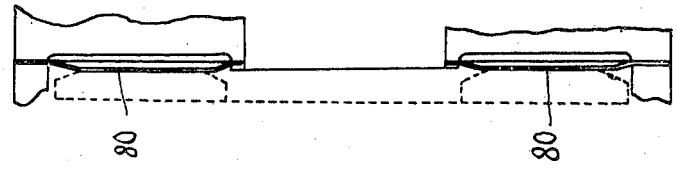
Figure 11 is a side view of a diaphragm in the "wear" position with the clutch engaged.
Figure 8:
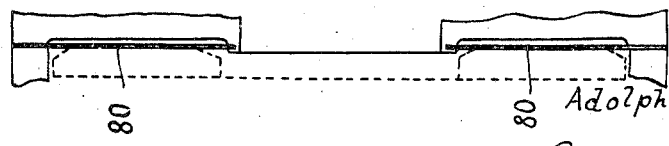
Figure 8 shows diagrammatically a diaphragm in the position of rest.

When the device is new without any appreciable wear the clutch disc is driven when the diaphragm has taken its natural position under the influence of the fluid pressure, that is to say when it has become approximately flat anew (Figure 8). It is easy to conceive that the diaphragm will also have the possibility of yielding under deformation on the other side of its natural position within a degree at least equal to the degree corresponding to its primitive position (Figure 11). The additional stroke which is thus permitted will serve to compensate the wear which can occur after a certain time on the discs and plates without it being necessary that the diaphragm goes beyond its limit of elasticity.

I claim:

1. In an automatic change speed gear for motor vehicles and the like operating with successive clutch actuations effected by fluid pressure, comprising a plurality of concentric driven shafts, a plurality of clutch discs each fast on one of said shafts, a driving shaft, pairs of axially movable clutch discs arranged with the discs of each pair facing the two sides of one of the driven shaft discs, said pairs of discs being connected at their peripheries to the driving shaft, a metal diaphragm adjacent each driving shaft clutch plate, pressure chambers each closed by one of said diaphragms, said chambers rotating with the driving shaft, conduits for delivering fluid medium under a variable pressure to said chambers, automatic valves one in the delivery conduit to each chamber, and stepwise graduated loading means for the several valves.

2. In an automatic change speed gear for motor vehicles and the like operating with successive clutch actuations effected by fluid pressure, comprising a plurality of concentric driven shafts, a plurality of clutch discs each fast on one of said shafts, a driving shaft, for each speed of the gear a pair of axially movable clutch discs arranged facing the two sides of one of the driven shaft discs and connected peripherally to the driving shaft, a metal diaphragm adjacent each driving shaft clutch plate, pressure chambers each closed by one of said diaphragms, said chambers rotating with the driving shaft, conduits for delivering fluid medium under a variable pressure to said chambers, automatic valves controlling the admission of pressure medium to respective chambers, stepwise graduated loading means for the several valves, and a conduit system to deliver said medium first to the valve and chamber associated with first speed, then to the valve and chamber associated with second speed, and so on.

3. Automatic speed change gear after claim 2, in which the drive shaft has a distributor plate containing the valves and a housing is removably attached to the periphery of said plate, said housing forming the seat of each valve and having a chamber for said pressure medium above the valve.

4. Automatic speed change gear after claim 2, in which the drive shaft has a distributor plate containing the valves and housings are removably attached to the periphery of said plate, said housings forming the seat of the valve of each gear speed and having a chamber for said pressure medium above each valve.

5. Automatic speed change gear after claim 2, in which the drive shaft has a distributor plate containing the valves and housings are removably attached to the periphery of said plate, said housings forming the seat of the valve of each gear speed and having a chamber for said pressure medium above each valve, all said valves being connected by respective conduits to the diaphragm chambers associated with the several gear speeds.

ADOLPHE KÉGRESSE.